United States Patent [19]

Hiraoka et al.

[11] Patent Number: 5,085,925
[45] Date of Patent: Feb. 4, 1992

[54] OPTICAL RECORDING MEDIUM

[75] Inventors: Mizuho Hiraoka; Hiroyuki Imataki, both of Kawasaki, Japan

[73] Assignee: Canon Kabushiki Kaisha, Tokyo, Japan

[21] Appl. No.: 598,748

[22] Filed: Oct. 16, 1990

Related U.S. Application Data

[63] Continuation of Ser. No. 229,966, Aug. 9, 1988, abandoned.

[30] Foreign Application Priority Data

Aug. 12, 1987 [JP] Japan .................. 2-199952

[51] Int. Cl.$^5$ .................. B41M 05/26; G11B 07/24; B42D 15/02
[52] U.S. Cl. .................. 428/215; 428/412; 428/522; 428/323; 428/495; 428/419; 428/473.5; 428/516; 428/494; 427/39; 427/34; 430/945
[58] Field of Search .............. 428/215, 412, 419, 516, 428/522

[56] References Cited

FOREIGN PATENT DOCUMENTS

| 3039630 | 5/1982 | Fed. Rep. of Germany | 428/412 |
| 2018290A | 1/1987 | Japan | 428/412 |
| 3007532A | 1/1988 | Japan | 428/412 |

Primary Examiner—P. C. Sluby
Attorney, Agent, or Firm—Fitzpatrick, Cella, Harper & Scinto

[57] ABSTRACT

An optical recording medium comprises an optical recording layer provided on a substrate, a protective material and a bond layer for bonding the optical recording layer to the protective material, the bond layer having a thermoplastic adhesive comprising at least one of (A) at least one selected from an ethylene-acrylic acid copolymer and an ethylene-acrylate ester copolymer and (B) an ethylene-maleic anhydride-acrylic acid terpolymer; and (C) a tackifier.

12 Claims, 1 Drawing Sheet

OPTICAL RECORDING MEDIUM

This application is a continuation of application Ser. No. 229,966, filed Aug. 9, 1988, now abandoned.

BACKGROUND OF THE INVENTION

1. Field of the Invention

This invention relates to media for optically recording and reproducing information.

2. Related Background Art

Heretofore, magnetic materials have been mainly used as materials for recording media, for example, credit cards floppy disc, etc. Magnetic recording media are advantageous that writing and reading of information can be readily carried out, but are problematic in that the recorded information can be readily altered and high density recording cannot carried out. In order to solve these problems and efficiently handling various kinds of information, methods for optically recording information with an optical recording medium have been proposed. In this connection, optical recording media, recording and reproducing systems, recording and reproducing apparatus, etc. have been also proposed. For example, an optical recording medium having a recording layer comprising a gelatin matrix and silver particles dispersed in the gelatin matrix has been proposed as a medium for optically recording and reproducing information. Furthermore, the heat mode recording material which can record information by spotwise irradiating a recording layer containing the recording material with an energy beam such as laser beam, etc., thereby partially changing the state of the recording layer has been also proposed. These recording materials require no developing treatment after the writing of information, and thus provide DRAW (direct read after write) media which are expected to have applications as disc or card recording materials due to their high density recording capability and their information adding capability.

A film comprising an organic coloring matter whose physical properties can be changed with light of relatively long wavelength is free from the aforementioned problems, is non-toxic and can be formed by coating, that is, at a low product cost. Thus, applications of the film to an optical disk or card have been extensively studied and proposed.

Optical recording media now used in offices, for example, optical disks, etc. generally have a hollow structure, but pocketable optical recording media, for example, optical cards are desirably made as thin as possible. Although a tightly sealed structure is desirable for this purpose, the tight sealing leads to the following problem.

In case of the optical recording layer comprising an organic coloring matter, a material used in a bond layer laid on the recording layer for bonding it to a protective substrate may chemically attack the recording layer, resulting in a decrease in the recording contrast and a failure in information reproduction.

The optical recording media used in offices are preserved at constant temperature and humidity or encased with jackets, whereas pocketable optical recording media are actually exposed to severe service conditions, for example, severe temperature and humidity conditions, and also have many chances for bending, resulting in occurrence of peeling at the bond layer.

SUMMARY OF THE INVENTION

An object of the present invention is to provide an optical recording medium of good heat and cold resistance, free from peeling under high and low temperature conditions.

Another object of the present invention is to provide an optical recording medium free from deterioration of the recording layer due to an adhesive and free from peeling due to repeated bending.

According to the present invention, there is provided an optical recording medium which comprises an optical recording layer provided on a substrate, a protective material and a bond layer for bonding the optical recording layer to the protective material, the bond layer having a thermoplastic adhesive comprising at least one of (A) at least one selected from an ethylene-acrylic acid copolymer and an ethylene-acrylate ester copolymer and (B) an ethylene-maleic anhydride-acrylic acid terpolymer; and (C) a tackifier.

DETAILED DESCRIPTION OF THE INVENTION

The present optical recording medium will be described in detail below, referring to the accompanying drawings.

Figure 1:
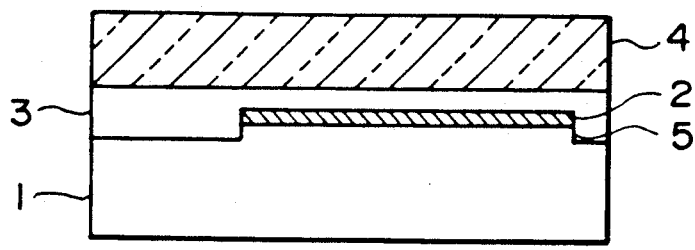
FIG. 1 is a schematic cross-sectional view showing one embodiment of the optical recording medium of the present invention.

FIG. 1 is a schematic cross-sectional view showing one embodiment of an optical card as an example of the present optical recording medium, where an optical card of the present invention comprises a transparent substrate 1 having track grooves 5, an optical recording layer 2, laid on the track groove side of the transparent substrate 1, and a protective material 4 bonded to the optical recording layer 2 through a bond layer 3.

The bond layer 3 of the present invention comprises a thermoplastic adhesive containing a tackifier (hereinafter referred to as compound C) and at least one of ethylene-acrylic acid copolymer or ethylene-acrylate ester copolymer hereinafter referred to as compound A), and ethylene-maleic anhydride-acrylic acid terpolymer hereinafter referred to as compound B). It is preferable that the thermoplastic adhesive for the bond layer contains 60 to 90% by weight of the total weight of compounds A and B and 10 to 20% by weight of compound C. The thermoplastic adhesive may also contain 1 to 10% by weight of an additive. The additive includes, for example, a plasticizer, a filler for extending purpose, anti-blocking, odor improvement, or reduction in the shrinkage, an anti-oxidant for improving the heat stability, and an elastomer for improving the softness.

Compound C as a tackifier includes, for example, terpene resin, terpene-phenol resin, hydrogenated terpene resin and terpene-phenol resin, petroleum resin of $C_5$ or $C_9$, rosin resin and its derivative, low molecular weight rubber, etc. Use of at least one of terpene resin, terpene-phenol resin and hydrogenated terpene resin and terpene-phenol resin is preferable from the viewpoint of lowering the softening point.

The thermoplastic adhesive for the bonding of the optical recording layer is desirably those that can give a satisfactory bonding strength at a low bonding temperature, when the heat resistance of the optical recording layer is taken into account. The thermoplastic adhesive for the bond layer 3 of the present invention has a softening point as low as 40°-60° C. and is particularly effective for an optical recording layer containing an organic coloring matter susceptible to heat deterioration and has a good cold resistance and a good adhesion to a polycarbonate substrate.

The thermoplastic adhesive, as in a sheet form, can bond a transparent substrate provided with an optical recording layer to a protective material, or a protective material onto which the thermoplastic adhesive is heat sealed in advance or a protective material provided with the thermoplastic adhesive through another adhesive can be bonded to the transparent substrate provided with the optical recording layer. The thickness of the bond layer is not particularly limited, but is usually 5 to 200 $\mu$m, preferably 10 to 80 $\mu$m.

The optical recording layer 2 preferably has a large difference between the reflectivity at the pits, etc. as the recorded parts and the reflectivity at unrecorded parts approximately at the wavelength of a light source for recording and/or reproduction, for example, when the wavelength of reproduction energy beam such as semiconductor beam is 650 nm or more, particularly 700-900 nm. It is also necessary for writing that the absorption is in the aforementioned wavelength range. Furthermore, it is preferable that the energy for changing the reflectivity by irradiation with a recording energy beam is low.

An optical recording layer, which can satisfy these requirements, is preferably a layer formed from a film comprising an organic coloring matter, particularly a polymethine-based organic coloring matter represented by the following general formula (I).

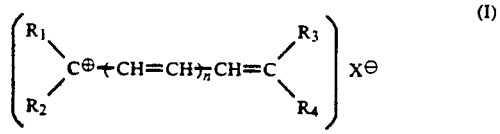

An excellent optical recording medium without deterioration of the properties of the recording layer containing a polymethine-based coloring matter very susceptible to attacking of an adhesive or heat, though it has distinguished recording-reproduction characteristics as mentioned above, can be obtained particularly by using the present adhesive. Further, each of these polymethine-based coloring matters has a high absorption coefficient in a semi-conductor laser wavelength region of about 800 nm and a good solubility and thus is preferable in the present invention. As the polymethine-based coloring matter, those disclosed in Japanese Patent Application Kokai (Laid-open) No. 58-219090 can be used.

A polymethine-based organic coloring matter represented by the general formula (I) will be described in detail below:

In the general formula (I), $R_1$, $R_2$, $R_3$ and $R_4$ each represent a hydrogen atom or an alkyl group, for example, methyl, ethyl, n-propyl, iso-propyl, n-butyl, sec-butyl, iso-butyl, t-butyl, n-amyl, t-amyl, n-hexyl, n-octyl, t-octyl, etc., or further other alkyl groups, for example, a substituted alkyl group such as 2-hydroxyethyl, 3-hydroxypropyl, 4-hydroxybutyl, 2-acetoxyethyl, carboxymethyl, 2-carboxyethyl, 3-carboxypropyl, 2-sulfoethyl, 3-sulfopropyl, 4-sulfobutyl, 3-sulfate propyl, 4-sulfate butyl, N-(methylsulfonyl)-carbonylmethyl, 3-(acetylsulfamyl) propyl, 4-(acetylsulfamyl)-butyl, etc., a cyclic alkyl group such as cyclohexyl, etc., an alkenyl group such as vinyl, allyl, propenyl, butenyl, pentenyl, hexenyl, heptenyl, octenyl, dodecenyl, prenyl, etc., an aralkyl group such as benzyl, phenethyl, α-naphthylmethyl, β-naphthylmethyl, etc., and a substituted aralkyl group such as carboxybenzyl, sulfobenzyl, hydroxybenzyl, etc. Furthermore, $R_1$, $R_2$, $R_3$ and $R_4$ each represent a substituted or unsubstituted aryl group such as phenyl, naphthyl, tolyl, xylyl, methyphenyl, dimethoxyphenyl, trimethoxyphenyl, ethoxyphenyl, dimethylaminophenyl, diethylaminophenyl, dipropylaminophenyl, dibenzylaminophenyl, diphenylaminophenyl, etc., a substituted or unsubstituted heterocyclic group such as pyridyl, quinolyl, lepidyl, methylpyridyl, furyl, thienyl, indolyl, pyrrolyl, carbazolyl, N-ethylcarbazolyl, etc., and a substituted or unsubstituted styryl group such as styryl, methoxystyryl, dimethoxystyryl, trimethoxystyryl, ethoxystyryl, dimethylaminostyryl, diethylaminostyryl, dipropylaminostyryl, dibenzylaminostyryl, diphenylaminostyryl, 2,2-diphenylvinyl, 2-phenyl-2-methylvinyl, 2-(dimethylaminophenyl)-2-phenylvinyl, 2-(diethylaminophenyl)-2-phenylvinyl, 2-(dibenzylamino-phenyl)-2-phenylvinyl, 2,2-di(diethylaminophenyl)vinyl, 2,2-di(methoxyphenyl)vinyl, 2,2-di(ethoxyphenyl)vinyl, 2-(dimethylaminophenyl)-2-methylvinyl, 2-(diethylamino-phenyl)-2-ethylvinyl, etc. n is 0,1 or 2.

$X^{\ominus}$ represents an anionic group, for example, anions such as chloride ion, bromide ion, iodide ion, perchlorate ion, benzenesulfonate ion, p-toluenesulfonate ion, methylsulfate ion, ethylsulfate ion, propylsulfate ion, tetrafluoroborate ion, tetraphenylborate ion, hexafluoroarsenate ion, hexafluorophosphate ion, benzenesulfinate ion, acetate ion, trifluoroacetate ion, propionacetate ion, benzoate ion, oxalate ion, succinate ion, malonate ion, oleate ion, stearate ion, citrate ion, monohydrogen diphosphate ion, dihydrogen monophosphate ion, pentachlorostanate ion, chlorosulfonate ion, fluorosulfonate ion, trifluoromethanesulfonate ion, hexafluoroantimonate ion, molybdate ion, tungstenate ion, titanate ion, zirconate ion, etc.

Typical examples of the polymethine-based organic coloring matter represented by the general formula (I) are given below:

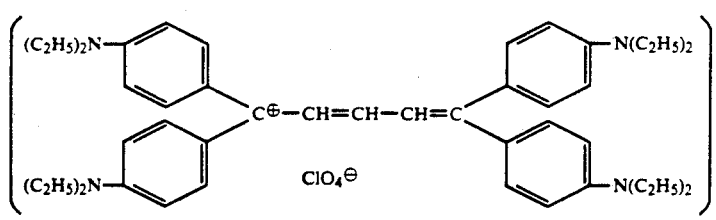
D-1
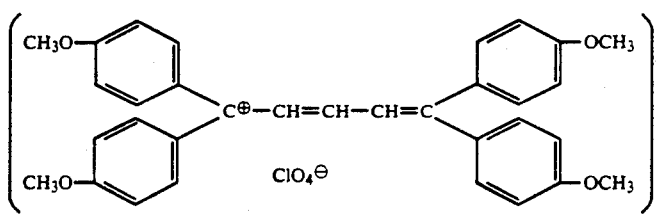
D-2
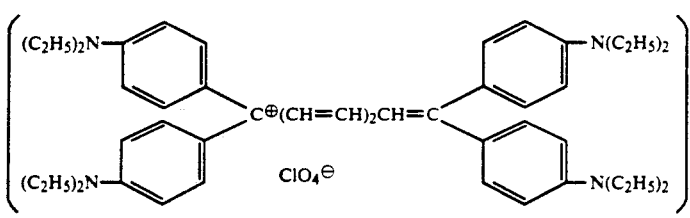
D-3
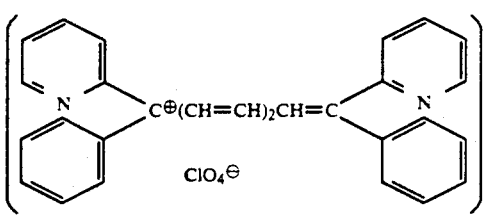
D-4
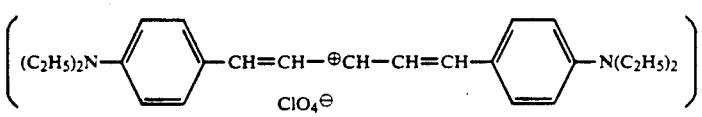
D-5
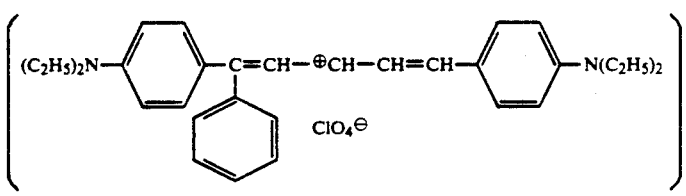
D-6
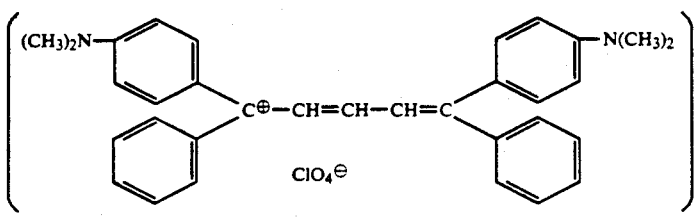
D-7

-continued

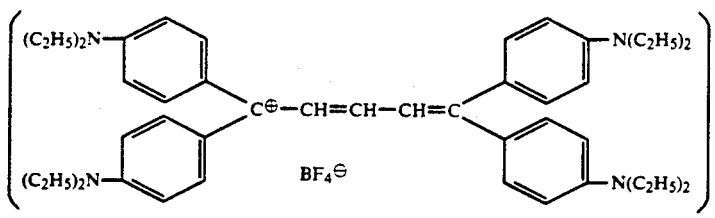
D-8

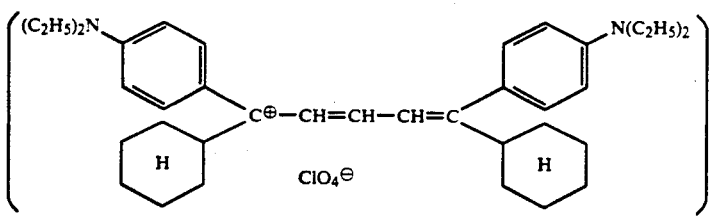
D-9

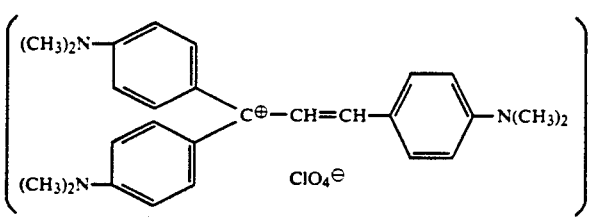
D-10

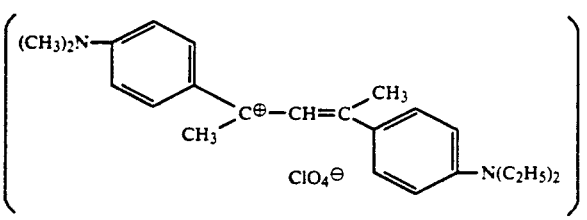
D-11

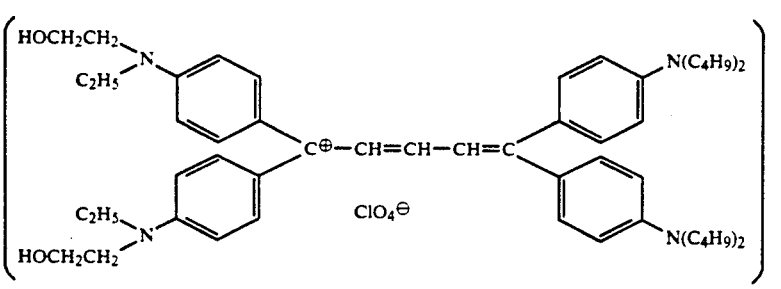
D-12

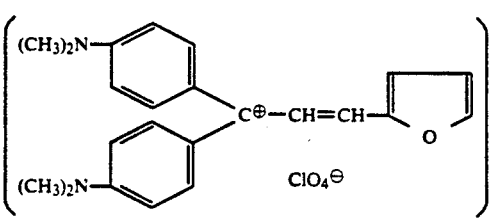
D-13

These polymethine-based organic coloring matters can be readily synthesized according to the processes disclosed by Bernard S. Wildi et al. [J. Am. Chem. Soc. 80 3772-3777(1958)], H. Schmidt et al. [Liebig Annalen der Chemie 623, 204-216]and R. Wilzinger et al. [Helv. Chim. Acta 24 369].

Any one of the aforementioned polymethine-based organic coloring matters can be used in the present invention. As a result of further studies in view of such requirements that the solubility must be high, crystallization of a film obtained after the coating and drying must be hard to take place, and the pigment must be hard to undergo changes in, for example, reflectivity, transmissivity, crystallization, etc. under a constant temperature and humidity atmosphere (50° C.; 90% RH), a polymethine-based organic coloring matter of D-1, given by the following formula (II) has been found excellent.

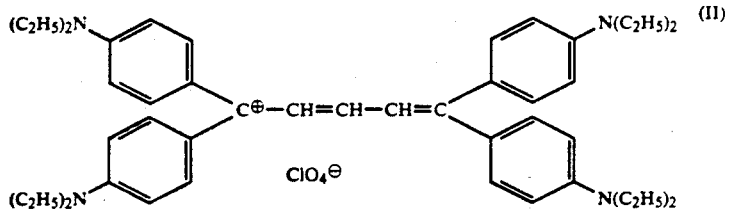

In forming of an optical recording layer, other dyes, for example, a metal chelate complex-based dye such as diazulene-based, azulene-based, polymethine-based, pyrilium-based, squalium-based, croconium-based, triphenylmethane-based, xanthene-based, anthraquinone-based, cyanine-based, phthalocyanine-based, dioxazine-based, tetrahydrocholine-based, triphenothiazine-based, and phenanthrene-based dyes or metal or metal compound such as Al, Te, Bi, Sn, In, Se, SnO, $TeO_2$, As, Cd, etc. may be mixed or dispersed with the polymethine-based organic coloring matter represented by the general formula (I) or laid on a layer containing the polymethine-based organic compound represented by the general formula (I).

Such dyes may be contained in a binder in a dispersion or solution state. As the binder, for example, cellulose esters such as nitrocellulose, cellulose phosphate, cellulose sulfate, cellulose acetate, cellulose propionate, cellulose butyrate, cellulose myristate, cellulose palmitate, cellulose acetate-propionate, cellulose acetate-butyrate, etc., cellulose ethers such as methylcellulose, ethylcellulose, propylcellulose, butylcellulose, etc., polystyrene, polyvinyl chloride, etc. can be used.

When the organic coloring matter is used for the optical recording layer, an organic sovlent is used. The organic solvent applicable to the coating depends upon application state, that is, a dispersion state or a solution state, but generally includes an alcohol such as methanol, ethanol, isopropanol, diacetonealcohol, etc., a ketone such as acetone, methylethylketone, cyclohexanone, etc., an amide such as N,N-dimethylformamide, N,N-dimethylacetamide, etc., a sulfoxide such as dimethyl sulfoxide, etc., and an ether such as tetrahydrofuran, dioxane, ethyleneglycolmonomethyl ether, etc. The optical recording layer can be formed according to a known coating method, for example, by dip coating, spray coating, spinner coating, bar coating, blade coating, roll coating, curtain coating, etc.

The optical recording medium of the present invention can have an underlayer between the optical recording layer and the substrate in order to (a) improve adhesion, (b) serve as a barrier against water or a gas, (c) improve the preservation stability of the optical recording layer, (d) improve reflectivity, (e) protect the substrate from the solvent and (f) form pregrooves.

For purpose (a), polymeric materials, for example, various materials such as ionomer resin, amide-based resin, vinyl-based resin, natural polymers, silicones, liquid rubber, etc. or various substances such as silane coupling agent, etc. can be used.

For purposes (b) and (c), inorganic compounds such as $SiO_2$, $MgF_2$, SiO, $TiO_2$, ZnO, TiN, SiN, etc. or metals or semi-metals such as Zn, Cu, Si, Ni, Cr, Ge, Se, Cd, Ag, Al, etc. can be used besides the above-mentioned polymeric materials.

For purpose (d), metals such as Al, Ag, etc. or an organic film having a metallic luster, for example, films of diazulene dye, polymethine dye, etc. can be used.

For purposes (e) and (f), an ultraviolet-curable resin, a thermoset resin, a thermoplastic resin, etc. can be used.

The thickness of the underlayer is 50 Å to 100 μm, preferably 200 Å to 30 μm.

The underlayer may contain a stabilizer, a dispersing agent, a flame retardant, a lubricant, an antistatic agent, a surfactant, a plasticizer, etc.

The transparent substrate 1 preferably has less inconvenience in the optical recording and reproduction, and can be formed from, for example, acrylic resin, polyester resin, polycarbonate resin, vinyl-based resin, polysulfone resin, polyimide-based resin, polyacetal resin, polyolefin resin, polyamide resin, cellulose derivatives, etc.

In the present invention, track grooves 5 can be formed on the transparent substrate 1, in case that the transparent substrate is formed from a thermoplastic resin, by heat transfer of a stamper pattern through injection molding or hot press molding at a temperature higher than the melting point, or photo-transfer of a stamper pattern by applying a photo-curable resin composition to the transparent substrate tightly placing a stamper pattern on the resin composition and irradiating the exposed resin composition with ultraviolet ray or the like, thereby curing the exposed photo-curable resin composition.

In case of the heat transfer, track grooves are indented on the transparent substrate itself, whereas in case of the photo-transfer the track grooves are formed on another material laid by adhesion onto the transparent substrate.

Besides the transfer of a stamper pattern, track grooves can be also formed on a transparent substrate by forming a resist film on a transparent resin substrate with an etchable light-transmissible film of a desired thickness, irradiating the resist film with a light through a photo mask having a track groove pattern, forming a resist pattern by development, and etching the light-transmissible film by means of the resist pattern as a mask.

The protective material 4 can be formed from any material so long as it can be applied for an ordinary protective material, and can be formed specifically from polyvinyl chloride, vinyl chloride-vinyl acetate copolymer, polyvinylidene chloride, acrylic polymer such as polymethyl methacrylate, etc., polystyrene, polyvinylbutyral, acetylcellulose, styrene-butadiene copolymer, polyethylene, polypropylene, polycarbonate, epoxy resin, acrylonitrile-butadiene-styrene copolymer, etc. A metal sheet of iron, stainless steel, aluminum, tin, copper, zinc, or the like, synthetic paper, paper, etc. can be used as the material for the protective material. Furthermore, a laminate of the aforementioned sheet materials can be applied for the protective material 4. The opaque protective material 4 may be pretreated by corona discharge treatment, plasma treatment, primer treatment, or the like to improve the adhesion, if required.

The present optical recording medium can record information by irradiation with a gas laser such as an argon laser (oscillation wavelength : 488 nm), a helium-neon laser (oscillation wavelength : 633 nm), a helium-cadmium laser (oscillation wavelength : 442 nm), or the like, and also can record information by irradiation with a SHG device beam of half-wavelength of the laser beam.

Recording by irradiation with a laser beam having an oscillation wavelength in the near infrared region such as a laser having a wavelength of 650 nm or more, particularly a gallium-aluminum-arsenic semi-conductor laser (oscillation wavelength : 830 nm) is preferable. For reading, the afore-mentioned laser beam can be used. Writing and reading can be made with laser beams of same wavelength or with laser beams of different wavelengths.

As described above, the bond layer of the present optical recording medium is formed from a thermoplastic adhesive comprising at least one of (A) at least one of an ethylene-acrylic acid copolymer and an ethylene-acrylate ester copolymer and (B) an ethylene-maleic anhydride acrylic acid terpolymer; and (C) a tackifier as mentioned above, and has distinguished adhesion and flexibility without any deterioration of the organic coloring matter in the optical recording layer. Thus, the present invention can provide an optical recording medium free from peeling while used and from any decrease in the sensitivity.

Conventional optical cards comprising a metallic thin film as an optical recording layer have such problems in that optical card sheets are less amenable to stamping for finishing the card sheet into card forms, the optical cards have a low bending durability, and the optical recording layer is liable to crack due to the hardness of the metallic film itself, whereas the present optical recording medium has no such problems since a thin film containing the aforementioned organic coloring matter is used as the optical recording layer.

The present invention will be described in detail below, referring to Examples, but will not be limited only thereto.

EXAMPLE 1

Track grooves with a groove width of 3 $\mu$m, a track pitch of 12 $\mu$m and a depth of 0.2 $\mu$m were formed on a polymethyl methacrylate casting plate having a thickness of 0.4 mm as a transparent resin substrate by hot press. A diacetone-alcohol solution containing 4 % by weight of the same polymethine-based coloring matter represented by the formula (II) as the afore-mentioned D-1 was applied to the track groove surface on the formed transparent resin substrate by bar coating, whereby the transparent substrate provided with an optically recording layer to a thickness of 1,000 Å on the track groove surface was obtained.

A polymethyl methacrylate casting plate having a thickness of 0.3 mm as a protective material was laid on the transparent substrate provided with the optical recording medium through a bond layer of a thermoplastic adhesive (softening point : 43°-51° C.) comprising 60% by weight of ethylene-acrylic acid copolymer, 17% by weight of ethylene-maleic anhydride-acrylic acid terpolymer, 20% by weight of terpene resin and 3% by weight of an additive and having a thickness of 50 $\mu$m, so that the optical recording layer can contact the thermoplastic adhesive, and bonded thereto by pressing with hot rolls at a surface temperature of 110° C. Then, an optical card, 54.0 mm wide and 85.5 mm long, was prepared therefrom by stamping out with a hollow rectangular stamping edge.

EXAMPLE 2

An optical card was prepared in the same manner as in Example 1, except that a coloring matter of afore-mentioned D-8 was used as the polymethine-based coloring matter and a thermoplastic adhesive (softening point : 41°-50° C.) comprising 45% by weight of ethylene-acrylic acid copolymer, 40% by weight of ethylene-maleic anhydride-acrylic acid terpolymer and 15% by weight of hydrogenated terpene resin was used.

EXAMPLE 3

Track grooves with a groove width of 3 $\mu$m, a track pitch of 12 $\mu$m and a depth of 0.2 $\mu$m were formed on a polymethyl methacrylate casting plate having a thickness of 0.4 mm as a transparent resin substrate by hot press, and a diacetone-alcohol solution containing 4% by weight of the same polymethine-based coloring matter represented by the foregoing formula (II) as D-1 was applied to the groove surface by bar coating, whereby a transparent substrate provided with an optical recording layer to a thickness of 1,000 Å on the groove surface was obtained.

A polymethyl methacrylate casting plate having a thickness of 0.3 mm as a protective material was laid on the transparent substrate provided with the optical recording layer through a bond layer of a thermoplastic adhesive (softening point : 46°-58° C.) comprising 70% by weight of ethylene-acrylic acid copolymer, 20% by weight of terpene resin and 10% by weight of an additive and having a thickness of 50 $\mu$m so that the optical recording layer can contact the thermoplastic adhesive, and bonded thereto by pressing with hot rolls at a surface temperature of 80° C. Then, an optical card, 54.0 mm wide and 85.5 mm long was stamped out with a hollow rectangular edge.

EXAMPLE 4

An optical card was prepared in the same manner as in Example 3, except that polycarbonate casting plates were used in place of the polymethyl methacrylate casting plates used as the transparent resin substrate and the protective material.

EXAMPLE 5

An optical card was prepared in the same manner as in Example 4, except that a thermoplastic adhesive comprising 65% by weight of ethylene-ethyl acrylate copolymer, 20% by weight of ethylene-acrylic acid copolymer, 10% by weight of terpene-phenol resin and 5% by weight of an additive was used.

EXAMPLE 6

An optical card was prepared in the same manner as in Example 4, except that the components of the thermoplastic adhesive were changed to 75% by weight of ethylene-ethyl acrylate copolymer, 15% by weight of terpene resin and 10% by weight of additive.

Comparative Example 1

An optical card was prepared in the same manner as in Example 1, except that a polyester-based adhesive, Kemitto (trademark of a product made by Toray K.K. Japan) was used as a thermoplastic adhesive in place of the adhesive of Example 1.

Comparative Example 2

An optical card was prepared in the same manner as in Example 1, except that an amide-based adhesive, Daiamide, (trademark of a product made by Daicel Kagaku Kogyo K.K., Japan) was used as a thermoplastic adhesive in place of the adhesive of Example 1.

Comparative Example 3

An optical card was prepared in the same manner as in Example 1, except that a thermoplastic adhesive comprising 70% by weight of ethylene-acrylic acid copolymer and 30% by weight of ethylene-maleic anhydride-acrylic acid terpolymer was used in place of the adhesive of Example 3.

The optical recording media prepared in Examples 1 to 6 and comparative Examples 1 to 3 were evaluated through the following tests:

(1) Contrast ratio

The optical card was scanned with a laser beam with a wavelength of 830 nm, a laser power of 3.5 mW, a beam spot diameter of 3.2 μm, and a pulse width of 50 μm at a speed of 60 mm/s to make recording, and a contrast ratio was determined. Contrast ratio is a value obtained by subtracting a ratio of the reflectivity at recorded parts to the reflectivity at unrecorded parts from 1.

(2) Heat resistance

The optical card was dipped in hot water at 60° C. to observe whether peeling took place at the bond layer or not.

(3) Bonding strength

The optical card not subjected to the heat resistance test was cut to pieces, 25 mm width, which were subjected to a T-type peeling test to determine the bonding strength at room temperature (25° C.) and −5° C.

(4) Bending test

Figures 2A, 2B:
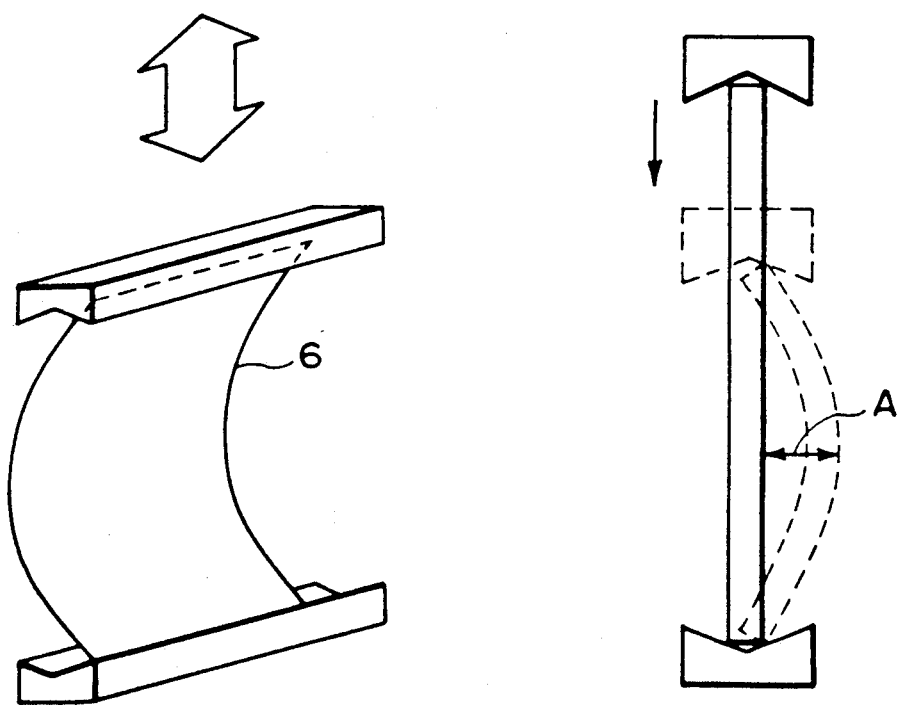
FIGS. 2A and 2B show a bending durability test procedure applied to the optical recording medium of the present invention.

The untested optical card was supported at the short side edges as shown in FIG. 2A and reciprocally bent 250 times in the lateral direction until the center part of the card was extended over a distance of 20 mm as shown by A in FIG. 2B, and then the optical card was supported at the long side edges and reciprocally bent 250 times in the lateral direction until the center part of the card was extended over a distance of 10 mm as shown by A to observe whether peeling took place at the bond layer or not.

The results are shown in the following Table.

TABLE 1

| | Contrast ratio | Heat resistance | Bonding strength (kg/25 mm) | | Bending test |
|---|---|---|---|---|---|
| | | | 25° C. | −5° C. | |
| Example 1 | 0.49 | no change | 0.3 | 0.25 | no peeling |
| Example 2 | 0.45 | " | 0.4 | 0.30 | " |
| Example 3 | 0.46 | " | 0.4 | 0.35 | " |
| Example 4 | 0.47 | " | 0.3 | 0.29 | " |
| Example 5 | 0.48 | " | 0.4 | 0.37 | " |
| Example 6 | 0.46 | " | 0.4 | 0.35 | " |
| Comp. Example 1 | 0.45 | Peeled after 72 hours | 0.2 | less than 0.1 | " |
| Comp. Example 2 | * | Peeled after 72 hours | 0.7 | 0.51 | " |
| Comp. Example 3 | 0.48 | no change | less than 0.1 | — | Peeled |

*The adhesive attacked the coloring matter in the optical recording layer and recording was impossible to make.

We claim:

1. An optical recording medium which comprises an optical recording layer provided on a substrate, a protective material and a bond layer for bonding the optical recording layer to the protective material, the bond layer having a thermoplastic adhesive comprising: (A) a tackifier and at least one of (B) an ethylene-acrylic acid copolymer, an ethylene-acrylate ester copolymer, or an ethylene-maleic anhydride-acrylic acid terpolymer.

2. An optical recording medium according to claim 1, wherein the tackifier is at least one of terpene resin, terpene-phenol resin and their hydrogenated resin.

3. An optical recording medium according to claim 1, wherein the optical recording layer contains a polymethine-based organic coloring matter.

4. An optical recording medium according to claim 3, wherein the polymethine-based, organic coloring matter is a compound represented by the following general formula (I):

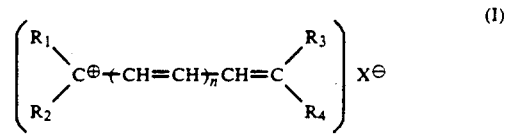

where $R_1$, $R_2$, $R_3$ and $R_4$ each represent a hydrogen atom, an alkyl group, a substituted alkyl group, a cyclic alkyl group, an alkenyl group, an aralkyl group, a substituted aralkyl group, an aryl group, a substituted aryl group, a styryl group, a substituted styryl group, a heterocyclic group or a substituted heterocyclic group; n is 0, 1 or 2; and $X^\ominus$ represents an anionic group.

5. An optical recording medium according to claim 3, wherein the polymethine-based, organic coloring matter is a compound represented by the following formula (II):

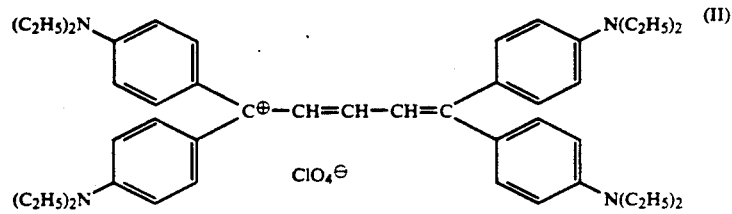

6. An optical recording medium according to claim 1, wherein the thermoplastic adhesive contains from 60 to 90% by weight of the total weight of said ethylene-acrylic acid and ethylene-acrylate ester copolymers, and said ethylene-maleic anhydride-acrylic acid terpolymer, and from 10 to 20% by weight of said tackifier.

7. An optical recording medium according to claim 1, wherein the bond layer has a thickness of 5 to 200 μm.

8. An optical recording medium according to claim 1, wherein the optical bond layer has a thickness of 10 to 80 μm.

9. An optical recording medium according to claim 1, wherein the optical recording layer has a thickness of 300 Å to 1500 Å.

10. An optical recording medium according to claim 9, wherein the optical recording layer has a thickness of 700 Å to 1300 Å.

11. An optical recording medium according to claim 1, wherein the optical recording medium is a card-type optical recording medium.

12. An optical recording medium according to claim 1, wherein an underlayer is provided between the optical recording layer and the substrate.

* * * * *